(12) United States Patent
Liang et al.

(10) Patent No.: US 11,699,812 B2
(45) Date of Patent: Jul. 11, 2023

(54) SULFIDE SOLID ELECTROLYTE AND METHOD FOR THE PREPARATION THEREOF, ALL-SOLID-STATE LITHIUM SECONDARY BATTERY, AND APPARATUS CONTAINING THE SAME

(71) Applicant: Contemporary Amperex Technology Co., Limited, Ningde (CN)

(72) Inventors: Chengdu Liang, Ningde (CN); Jiawei Fu, Ningde (CN); Chengyong Liu, Ningde (CN); Yongsheng Guo, Ningde (CN); Bobing Hu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 12 days.

(21) Appl. No.: 17/509,097

(22) Filed: Oct. 25, 2021

(65) Prior Publication Data
US 2022/0045358 A1    Feb. 10, 2022

Related U.S. Application Data

(63) Continuation of application No. PCT/CN2020/085649, filed on Apr. 20, 2020.

(30) Foreign Application Priority Data

Apr. 25, 2019 (CN) .......................... 201910338105.0

(51) Int. Cl.
*H01M 10/0562* (2010.01)
*H01M 10/0525* (2010.01)

(52) U.S. Cl.
CPC ............... *H01M 10/0562* (2013.01); *H01M 10/0525* (2013.01); *H01M 2300/0068* (2013.01)

(58) Field of Classification Search
CPC ......... H01M 10/0525; H01M 10/0562; H01M 2300/0068
See application file for complete search history.

(56) References Cited

U.S. PATENT DOCUMENTS

2016/0240890 A1   8/2016   Park et al.
2018/0205112 A1*  7/2018   Thomas-Alyea ... H01M 4/0404

FOREIGN PATENT DOCUMENTS

| CN | 100502111 C  | 6/2009 |
| CN | 102544580 A  | 7/2012 |
| CN | 102934279 A  | 2/2013 |
| CN | 103531849 A  | 1/2014 |

(Continued)

OTHER PUBLICATIONS

The International search report for PCT Application No. PCT/CN2020/085649, dated Jul. 20, 2020, 12 pages.

(Continued)

*Primary Examiner* — Osei K Amponsah
(74) *Attorney, Agent, or Firm* — East IP P.C.

(57) ABSTRACT

The present application discloses a sulfide solid electrolyte and a method for the preparation thereof, an all solid state lithium secondary battery, and an apparatus containing the all solid state lithium secondary battery. The sulfide solid electrolyte is obtained by compounding at least $Li_2S$, $P_2S_5$ and a dopant $M_xS_2O_3$, wherein M is one or more selected from Na, K, Ba and Ca, and $1 \leq x \leq 2$.

20 Claims, 4 Drawing Sheets

(56) References Cited

FOREIGN PATENT DOCUMENTS

| | | |
|---|---|---|
| CN | 103560267 A | 2/2014 |
| CN | 103796964 A | 5/2014 |
| CN | 103959546 A | 7/2014 |
| CN | 103531841 B | 3/2016 |
| CN | 108091923 A | 5/2018 |
| CN | 108493479 A | 9/2018 |
| CN | 108780682 A | 11/2018 |
| WO | 2018135862 A1 | 7/2018 |

OTHER PUBLICATIONS

The First Office Action for China Application No. 201910338105.0, dated Mar. 11, 2021, 16 pages.
Particle size analysis-Laser diffraction methods. GB/T 19077-2016, dated Feb. 24, 2016, 47 pages.
The EESR for European Application No. 20794184.0, dated Mar. 28, 2022, 9 pages.
Fudong Han et al. "Suppressing Li Dendrite Formation in Li2S-P2S5 Solid Electrolyte by Li Incorporation", dated Mar. 12, 2018, 6 pages.
Fu-xin Hu et al. "The preparation of a new high polymeric solid electrolyte sodium acetate and sodium thiosulfate" dated Jul. 31, 2002, 2 pages.

\* cited by examiner

SULFIDE SOLID ELECTROLYTE AND METHOD FOR THE PREPARATION THEREOF, ALL-SOLID-STATE LITHIUM SECONDARY BATTERY, AND APPARATUS CONTAINING THE SAME

CROSS-REFERENCE TO RELATED APPLICATION

This application is a continuation of International Application No. PCT/CN2020/085649, filed on Apr. 20, 2020, which claims priority to Chinese Patent Application No. 201910338105.0 entitled "Sulfide Solid Electrolyte and All-Solid-State Lithium Secondary Battery" and filed on Apr. 25, 2019, both of which are incorporated herein by reference in their entireties.

TECHNICAL FIELD

This application relates to the technical field of batteries, in particular to a sulfide solid electrolyte and a method for the preparation thereof, an all-solid-state lithium secondary battery, and an apparatus containing the all-solid-state lithium secondary battery.

BACKGROUND

Lithium secondary batteries are widely used in various fields due to their advantages of high energy density and good electrochemical performance. At present, the most commonly used lithium secondary batteries are liquid-state secondary batteries, and electrolyte materials thereof mainly use liquid electrolyte materials, which contain a large amount of organic solvents, so that potential safety hazards are prominent in use. All-solid-state lithium secondary batteries have safety performance incomparable to those of the liquid-state lithium secondary batteries, and the potential safety hazards in use may be expected to be thoroughly eliminated, which better meet the requirements of future development in the fields of electric vehicles and large-scale energy storage, so that researchers in various countries are vigorously developing the all-solid-state lithium secondary batteries.

Up to now, the all-solid-state lithium secondary batteries have not been widely used, and the main bottleneck restricting their full application is the research and development of high-performance solid electrolyte materials (solid electrolyte, referred to as SE). In order to improve the market competitiveness of the all-solid-state lithium secondary batteries, it is indeed necessary to provide a high-performance solid electrolyte material.

SUMMARY

The current solid electrolyte materials mainly include: polymers, oxides, sulfides and other categories. The conductivity of a polymer solid electrolyte at room temperature is extremely low (usually <$10^{-6}$ S/cm), so it is difficult to play its advantages. The conductivity of an oxide solid electrolyte is also low, and its hardness is usually large, so it is difficult to adapt to the change of the electrode size during the charging and discharging process, and thus the problem of matching failure is prone to occur. A sulfide solid electrolyte has the advantages of higher room-temperature conductivity, good interface contact with an electrode and the like, so it may be used as the first choice for the solid electrolyte of an all-solid-state lithium secondary battery.

However, the inventors have discovered through research that the existing sulfide solid electrolyte has worse electrochemical stability, which will adversely affect the electrochemical performance of the all-solid-state lithium secondary battery using it.

Therefore, the inventors have conducted a lot of research, aiming to provide a sulfide solid electrolyte having higher ionic conductivity and higher electrochemical stability at the same time, and also to provide a method for the preparation of the sulfide solid electrolyte.

Another object of the present application is to provide an all-solid-state lithium secondary battery with higher first-cycle specific capacity, higher first-cycle coulombic efficiency and good cycle performance.

In order to achieve the above objects, a first aspect of the present application provides a sulfide solid electrolyte, which is obtained by compounding at least $Li_2S$, $P_2S_5$ and a dopant $M_xS_2O_3$, wherein M is one or more selected from Na, K, Ba and Ca, and $1 \leq x \leq 2$.

A second aspect of the present application provides an all-solid-state lithium secondary battery, including a positive electrode plate, a negative electrode plate and a solid electrolyte membrane, wherein the solid electrolyte membrane includes the sulfide solid electrolyte according to the first aspect of the present application.

A third aspect of the present application provides an apparatus, including the all-solid-state lithium secondary battery according to the second aspect of the present application.

A fourth aspect of the present application provides a method for the preparation of the sulfide solid electrolyte, including:

performing a ball milling treatment on $Li_2S$, $P_2S_5$ and the dopant $M_xS_2O_3$ in the presence of an organic solvent to obtain an incipient wet material;

removing the organic solvent from the incipient wet material to obtain a mixed material; and performing a heat treatment on the mixed material at a temperature of 150° C. to 450° C. for 0.5 h to 20 h to obtain the sulfide solid electrolyte.

Compared with the prior art, the present application at least has the following beneficial effects:

It is surprisingly found that the sulfide solid electrolyte of the present application may have the advantages of high ionic conductivity and good electrochemical stability by doping the $M_xS_2O_3$. More preferably, the all-solid-state lithium secondary battery using the sulfide solid electrolyte of the present application may have high first-cycle specific capacity, high first-cycle coulombic efficiency and good cycle performance. The apparatus of the present application includes the all-solid-state lithium secondary battery, and therefore at least has the same advantages.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value may be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which may be used in various combinations. In each instance, the enumeration is only a representative group and should not be interpreted as exhaustive.

Sulfide Solid Electrolyte

First, the sulfide solid electrolyte according to the first aspect of the present application is explained.

The sulfide solid electrolyte according to the first aspect of the present application is obtained by compounding at least $Li_2S$, $P_2S_5$ and a dopant $M_xS_2O_3$, wherein M is one or more selected from Na, K, Ba and Ca, and $1 \leq x \leq 2$.

The solid electrolyte is an electrolyte that transmits charges between positive and negative electrodes in a solid state. For an all-solid-state lithium secondary battery, in order to ensure good electrochemical performance and safety performance, the solid electrolyte is usually required to have high ionic conductivity and low electronic conductivity. That is to say, lithium ions can be transmitted in the solid electrolyte, but electrons cannot be transmitted in the solid electrolyte. The ionic conductance of the solid electrolyte is a diffusion phenomenon of ions under the action of an electric field, including inherent ionic conductance and impurity conductance. The inherent ionic conductance is called as the intrinsic conductance of the solid electrolyte, which is an expression of ion movement in the solid electrolyte. The inherent ionic conductance reflects the mobility capacity of the ions, which is related to the charge level of the moving ions in the solid electrolyte and the crystal structure of the solid electrolyte. Generally, monovalent cations have few charges and low activation energy, so their ionic conductivity is high. On the contrary, high-valent cations have strong valence bonds and high activation energy, so the migration rate is low and the ionic conductivity is lower. At the same time, in an ionic crystal with a compact structure, due to the small gaps for ion movement, the migration of the ions between the gaps is difficult, resulting in high activation energy for ion migration and lower ionic conductivity. Therefore, if the solid electrolyte is required to have high ionic conductivity, it must have ion lattice defects with large concentration, and these lattice defects participate in the ionic conductance, that is to say, the generation and the concentration of the ion lattice defects are keys to determine the ionic conductivity of the solid electrolyte.

The sulfide solid electrolyte of the present application is obtained by compounding at least $Li_2S$, $P_2S_5$ and $M_xS_2O_3$, and it is a glass ceramic solid electrolyte in which a glass phase and a crystal phase are uniformly mixed, wherein $P_2S_5$ is a glass-phase-network-forming sulfide, $Li_2S$ is a glass phase network modified sulfide, and $M_xS_2O_3$ is a dopant.

$P_2S_5$ can form strong interconnected and long-range disordered macromolecular chains to promote the transmission of lithium ions in the solid electrolyte. $Li_2S$ can chemically react with $P_2S_5$ to break some sulfur bridges in the macromolecular chains, and to reduce the average length of the macromolecular chains, so as to reduce the viscosity of the glass phase, which is conducive to the rapid transmission of the lithium ions. In a glass phase network formed by the interaction therebetween, the sulfur has a greater ion radius and smaller electronegativity, so the binding effect on the lithium ions is weak. At the same time, the long-range disordered glass phase network also provides a longer transmission channel for the lithium ions, which facilitates the transmission of the lithium ions, so that the sulfide solid electrolyte has higher ionic conductivity as a whole. In addition, from the perspective of thermodynamics, since the glass phase formed by $Li_2S$ and $P_2S_5$ is a metastable state with higher internal energy, it can be transformed into the crystal phase under certain heating conditions, that is to say, the glass phase formed by $Li_2S$ and $P_2S_5$ can be transformed into crystal phases, i.e., $PS_4^{3-}$ phase and $P_2S_7^{4-}$ phase, under certain heating conditions. From the perspective of kinetics, during the cooling process of the glass phase, the rapid increase in the system viscosity hinders the generation and the growth of crystal nuclei, and there is no sufficient time to completely transform the glass phase into crystals, so a coexistence state of the crystal phases (the $PS_4^{3-}$ phase and the $P_2S_7^{4-}$ phase) and the glass phase is formed at last, wherein the formation of the $PS_4^{3-}$ phase and the $P_2S_7^{4-}$ phase can further improve the ionic conductivity of the sulfide solid electrolyte. The reason is that, on one hand, the boundary between the formed $PS_4^{3-}$ phase and the $P_2S_7^{4-}$ phase is surrounded by the glass phase, so that the boundary impedance is greatly reduced, and on the other hand, the $PS_4^{3-}$ phase and the $P_2S_7^{4-}$ phase themselves have higher ionic conductivity.

By doping the $M_xS_2O_3$, the ionic conductivity of the sulfide solid electrolyte can be improved by constructing voids and changing the size of the transmission channel of the lithium ions. The reason is that the sizes of M ions in $M_xS_2O_3$ are greater than those of the lithium ions. Therefore, more lattice distortions will be generated in the crystal formed after $M_xS_2O_3$ doping, more lattice defects are formed, and the size of the lithium ion channel in the crystal is enlarged, so that the sulfide solid electrolyte can obtain higher lithium ionic conductivity. At the same time, the excess sulfur atoms carried by $M_xS_2O_3$ can be combined with the non-bridging sulfur in the matrix to form bridging sulfur, which effectively reduces the resistance of the sulfide solid electrolyte and further improves the ionic conductivity of the sulfide solid electrolyte. In addition, $M_xS_2O_3$ itself is an oxygen-containing compound, the introduction of $M_xS_2O_3$ is equivalent to the introduction of oxygen atoms with higher electronegativity, which can also improve the electrochemical stability of the sulfide solid electrolyte. By introducing the oxygen atoms with higher electronegativity, the stability of the sulfide solid electrolyte to water and oxygen is also improved.

Therefore, the sulfide solid electrolyte obtained by compounding $Li_2S$, $P_2S_5$ and the dopant $M_xS_2O_3$ in the present application can have the advantages of high ionic conductivity and good electrochemical stability. The sulfide solid electrolyte of the present application is applied to an all-solid-state lithium secondary battery, so that the all-solid-state lithium secondary battery has high first-cycle specific capacity, high first-cycle coulombic efficiency and good cycle performance.

In the sulfide solid electrolyte according to the first aspect of the present application, the molar percentage of $Li_2S$ is preferably 60% or more. On one hand, the source of lithium ions in the sulfide solid electrolyte is sufficient, which can improve the ionic conductivity of the sulfide solid electrolyte; and on the other hand, the finally obtained sulfide solid electrolyte can contain an appropriate amount of bridging sulfur, which is beneficial to the fast transmission of the lithium ions therein and can also improve the ionic conductivity of the sulfide solid electrolyte. The molar percentage of $Li_2S$ in the sulfide solid electrolyte is preferably 80% or less. Then, the ratio of the content of the bridging sulfur to the content of the non-bridging sulfur in the finally obtained sulfide solid electrolyte is appropriate, which can improve the rapid transmission performance of the lithium ions therein, and therefore can improve the ionic conductivity of the sulfide solid electrolyte.

Preferably, the molar percentage of $Li_2S$ is greater than or equal to 60% and is less than or equal to 79%. Further preferably, the molar percentage of $Li_2S$ is greater than or equal to 70% and is less than or equal to 79%, for example, 65%, 68%, 70%, 72%, 75%, or 77%.

In the sulfide solid electrolyte according to the first aspect of the present application, the molar percentage of $P_2S_5$ is preferably 16% or more. Then, the sulfide solid electrolyte can effectively form interconnected and long-range disordered molecular chains, which is conducive to the rapid transmission of the lithium ions. The molar percentage of $P_2S_5$ in the sulfide solid electrolyte is preferably 35% or less. Then, the average length of the interconnected and long-range disordered macromolecular chains in the sulfide solid electrolyte is smaller, which is beneficial to reducing the viscosity of the glass phase, and meanwhile ensuring a sufficient $Li_2S$ content to break some sulfur bridges in the macromolecular chains, thereby being conducive to the rapid transmission of the lithium ions.

Preferably, the molar percentage of $P_2S_5$ is greater than or equal to 16% and is less than or equal to 30%. Further preferably, the molar percentage of $P_2S_5$ is greater than or equal to 20% and is less than or equal to 30%. Particularly preferably, the molar percentage of $P_2S_5$ is greater than or equal to 20% and is less than or equal to 29%, for example, 18%, 20%, 22%, 24%, 25%, or 28%.

In the sulfide solid electrolyte according to the first aspect of the present application, the molar percentage of $M_xS_2O_3$ is preferably greater than 0% and is less than or equal to 10%. Then, $M_xS_2O_3$ can make more lattice distortions formed in the crystals, while maintaining higher structural stability of the crystals, so that the sulfide solid electrolyte has higher ionic conductivity and higher electrochemical stability. This further improves the first-cycle specific capacity, the first-cycle coulombic efficiency and the cycle performance of the all-solid-state lithium secondary battery.

Further preferably, the molar percentage of $M_xS_2O_3$ is less than or equal to 5%. More preferably, the molar percentage of $M_xS_2O_3$ is greater than or equal to 1% and is less than or equal to 5%, for example, 0.5%, 0.8%, 1%, 1.5%, 2%, 2.5%, 3%, 3.5%, 4%, or 5%.

In some preferred embodiments, in $M_xS_2O_3$, M comprises one or more of Na and K, and preferably M comprises Na. As the dopant, $M_xS_2O_3$ has an appropriate size by introducing the alkali metal atom M, and can form moderate lattice distortion in the crystal structure of the sulfide solid electrolyte, which is more conducive to improving the ionic conductivity.

In some preferred embodiments, the sulfide solid electrolyte is a multiphase composite containing a glass phase and a crystal phase, including $PS_4^{3-}$, $P_2S_7^{4-}$ and $P_2S_6^{4-}$, and the ratio of Raman characteristic peak intensities of the $PS_4^{3-}$, $P_2S_7^{4-}$ and $P_2S_6^{4-}$ is 1-60:1-60:0.01-1, further is 6-40:3-40:0.01-0.5, and further is 20-40:10-20:0.01-0.1. The ratio of Raman characteristic peak intensities of the $PS_4^{3-}$, $P_2S_7^{4-}$ and $P_2S_6^{4-}$ in the sulfide solid electrolyte is within an appropriate range, so that the sulfide solid electrolyte can have higher ionic conductivity and stability.

In some preferred embodiments, the average particle size of the sulfide solid electrolyte is from 5 μm to 50 μm. The inventors found that the average particle size of the sulfide solid electrolyte is within an appropriate range, which can make a solid electrolyte membrane, a positive electrode plate and/or a negative electrode plate using the sulfide solid electrolyte have a higher lithium ion diffusion coefficient; and at the same time, the interface contact between the solid electrolyte membrane and the electrode is good, and the interface resistance is lower, thereby improving the electrochemical performance of the all-solid-state lithium secondary battery, such as the cycle performance. The average particle size of the sulfide solid electrolyte is more than 5 μm, preferably more than 10 μm, and the preparation process can also be simplified.

Further preferably, the average particle size of the sulfide solid electrolyte is from 10 μm to 20 μm. For example, the average particle size of the sulfide solid electrolyte is 12 μm, 15 μm, 18 μm, 20 μm, 22 μm, 25 μm, 30 μm, or 35 μm.

In some embodiments, the ionic conductivity of the sulfide solid electrolyte is from 0.6 mS/cm to 2.5 mS/cm, such as 0.8 mS/cm, 1.0 mS/cm, 1.2 mS/cm, 1.4 mS/cm, 1.5 mS/cm, 1.6 mS/cm, 1.7 mS/cm, 1.8 mS/cm or 2.0 mS/cm. The sulfide solid electrolyte has higher ionic conductivity, which is beneficial for the all-solid-state lithium secondary battery to have higher electrochemical performance, and the all-solid-state lithium secondary battery has higher first-cycle specific capacity, first-cycle Coulombic efficiency and cycle performance.

In some embodiments, in a cyclic voltammetry curve diagram of the sulfide solid electrolyte (the specific test process is as follows: lithium metal is used as a working electrode, stainless steel is used as a counter electrode, and the test is performed after a half-battery is assembled; the scanning potential interval is from −0.5 V to 6 V, the scanning speed is 1 mV/s, the test conditions are normal temperature 25° C. and normal pressure 0.1 MPa), the peak current ratio of an anode peak to a cathode peak is from 0.55 to 0.85. It can be seen that the peak current ratio of the positive electrode peak to the negative electrode peak is relatively close to an ideal ratio of 1. Therefore, the electrode reaction of the present application has good reversibility, and the sulfide solid electrolyte has better $Li^+$/Li intercalation/ extraction reversibility, which indicates that the sulfide solid electrolyte of the present application has the advantage of good electrochemical stability, and it can also indicate that the all-solid-state lithium secondary battery comprising the sulfide solid electrolyte of the present application has good cycle performance. For example, in the cyclic voltammetry curve diagram of the sulfide solid electrolyte, the peak current ratio of the anode peak to the cathode peak is 0.6, 0.65, 0.67, 0.7, 0.75, 0.76, 0.77, 0.78, 0.79, 0.8, 0.81, or 0.83.

Next, a method for the preparation of the sulfide solid electrolyte is provided. The above-mentioned sulfide solid electrolyte can be prepared by the preparation method.

In some embodiments, preferably, the sulfide solid electrolyte is prepared from $Li_2S$, $P_2S_5$ and $M_xS_2O_3$ through a heat treatment process.

In some embodiments, preferably, the purity of $Li_2S$, $P_2S_5$ and $M_xS_2O_3$ is independently 98% or more, such as 99% or more.

In some embodiments, preferably, the heat treatment temperature is from 150° C. to 450° C. Further preferably, the heat treatment temperature is from 200° C. to 400° C., for example, 225° C., 230° C., 240° C., 250° C., 260° C., 280° C., 300° C., 320° C., or 350° C. The inventors discovered through research that if the heat treatment temperature is within an appropriate range, the obtained sulfide solid electrolyte can contain more $PS_4^{3-}$ phase and $P_2S_7^{4-}$ phase with high ionic conductivity characteristics, so the ionic conductivity thereof is higher.

In the heat treatment process, the heating rate can be from 0.5° C./min to 10° C./min, further from 1° C./min to 5° C./min, and still further from 2° C./min to 3° C./min.

In some embodiments, preferably, the heat treatment time is from 0.5 h to 20 h. Further preferably, the heat treatment time is from 1 h to 10 h, for example 1.5 h, 2 h, 2.5 h, 3 h, 3.5 h, 4 h, 5 h, 6 h, 7 h, 8 h or 9 h. The inventors further found that if the heat treatment time is within an appropriate range, the obtained sulfide solid electrolyte can contain more $PS_4^{3-}$ phase and $P_2S_7^{4-}$ phase with high ionic conductivity characteristics, so the ionic conductivity thereof is higher.

The heat treatment process is preferably performed in a protective gas atmosphere, for example, in an inert gas (such as argon) atmosphere. Preferably, the moisture content in the protective gas atmosphere is less than 1 ppm, and the oxygen content is less than 1 ppm.

In some embodiments, before the heat treatment process, the method further includes: mixing $Li_2S$, $P_2S_5$ and $M_xS_2O_3$ in proportions to obtain a premix; then performing a ball milling treatment on the premix in the presence of an organic solvent to obtain an incipient wet material; removing the organic solvent from the incipient wet material to obtain a mixed material; and then performing a heat treatment on the mixed material to obtain the sulfide solid electrolyte.

The step of preparing the premix, the step of preparing the incipient wet material, and/or the step of removing the solvent are/is preferably performed in a protective gas atmosphere, for example, in an inert gas (such as argon) atmosphere. Preferably, the moisture content in the protective gas atmosphere is less than 1 ppm, and the oxygen content is less than 1 ppm.

In some embodiments, in the step of preparing the incipient wet material, grinding balls can use one or more of $ZrO_2$ balls and $Al_2O_3$ balls, such as $ZrO_2$ balls. The ball-to-material ratio (mass ratio) can be from 20:1 to 80:1, preferably from 30:1 to 60:1, and more preferably from 40:1 to 50:1.

In some embodiments, in the step of preparing the incipient wet material, the organic solvent can be one or more of hexane, cyclohexane, heptane, octane, benzene, toluene, xylene and ethylbenzene, such as cyclohexane. The volume ratio of the organic solvent to the premix can be from 1:1 to 5:1, for example, from 2:1 to 4:1, such as 10:3.

In some embodiments, in the step of preparing the incipient wet material, the ball milling can be performed in a ball mill. The rotating speed of the ball milling can be from 300 rpm to 700 rpm, and preferably from 400 rpm to 600 rpm, such as 500 rpm. The ball milling time can be from 5 h to 30 h, for example from 10 h to 25 h, and as another example from 15 h to 20 h.

Through the ball milling treatment, the materials can be mixed more sufficiently, and at the same time, smashing can also be performed to refine the particles so as to improve the reactivity.

In some embodiments, before the heat treatment process, the mixed material can also be tableted to form a flake material. The tableting pressure can be from 10 MPa to 30 MPa, for example, from 15 MPa to 25 MPa, such as 20 MPa. After the heat treatment of the flake material, the material can be pulverized to a desired particle size by grinding.

All-Solid-State Lithium Secondary Battery

Next, the all-solid-state lithium secondary battery according to the second aspect of the present application will be described.

The all-solid-state lithium secondary battery according to the second aspect of the present application comprises a positive electrode plate, a negative electrode plate and a solid electrolyte membrane, wherein the solid electrolyte membrane comprises the sulfide solid electrolyte according to the first aspect of the present application.

In some embodiments, preferably, the average particle size of the sulfide solid electrolyte in the solid electrolyte membrane is from 5 μm to 50 μm. The particle size of the sulfide solid electrolyte within the appropriate range is conducive to compacting the compressed solid electrolyte membrane, and resulting in gaps between the particles smaller, thereby reducing the solid phase diffusion barrier of the lithium ions and improving the diffusion coefficient of the lithium ions. At the same time, the sulfide solid electrolyte has an appropriate particle size, which is also conducive to the good interface contact between the solid electrolyte membrane and the positive electrode, and the interface resistance is lower, thereby improving the cycle performance of the all-solid-state lithium secondary battery. In addition, even when lithium dendrites are generated in the negative electrode, the dense solid electrolyte membrane can also prevent the lithium dendrites from piercing the solid electrolyte membrane to reach the positive electrode, thereby effectively preventing the safety problems of the all-solid-state lithium secondary batteries caused by internal short circuits.

More preferably, the average particle size of the sulfide solid electrolyte in the solid electrolyte membrane is from 10 μm to 20 μm.

In the all-solid-state lithium secondary battery according to the second aspect of the present application, the positive electrode plate can comprise a positive electrode current collector and a positive electrode film disposed on the positive electrode current collector and comprising a positive electrode active material. The type of the positive electrode active material is not specifically limited, and can be selected according to actual needs. The negative electrode plate can comprise a negative electrode current collector and a negative electrode film disposed on the negative electrode current collector and comprising a negative electrode active material. The type of the negative electrode active material is not specifically limited, and can be selected according to actual needs.

In some embodiments, the positive electrode active material can be one or more selected from $LiFe_{x1}Mn_{y1}Me_{z1}PO_4$ (in which $0 \leq x1 \leq 1$, $0 \leq y1 \leq 1$, $0 \leq z1 \leq 1$, $x1+y1+z1=1$, Me is one or more selected from Al, Mg, Ga, Ti, Cr, Cu, Zn and Mo), $Li_3V_2(PO_4)_3$, $Li_3V_3(PO_4)_3$, $LiVPO_4F$, $LiNi_{0.5-x2}Mn_{1.5-y2}M'_{x2+y2}O_4$ (in which $-0.1 \leq x2 \leq 0.5$, $0 \leq y2 \leq 1.5$, M' is one or more selected from Mn, Co, Fe, Al, Mg, Ca, Ti, Mo, Cr, Cu and Zn), and $Li_{1+x2}Ni_{1-2-z2}Co_{y2}M''_{z2}O_2$ (in which M'' is one or more selected from Mn, Fe, Al, Mg, Ga, Ti, Cr, Cu, Zn and Mo, $-0.1 \leq x2 \leq 0.2$, $0 \leq y2 \leq 1$, $0 \leq z2 \leq 1$, $0 \leq y2+z2 \leq 1$). Further, the positive electrode active material is one or more selected from $LiFePO_4$, $LiMnPO_4$, $LiNiPO_4$, $LiCoPO_4$, $Li_3V_3(PO_4)_3$, $LiMn_2O_4$, $LiNi_{0.5}Mn_{1.5}O_4$, $LiCoO_2$, $LiNiO_2$, $LiCo_{1/3}Ni_{1/3}Mn_{1/3}O_2$, $LiNi_{0.8}Co_{0.1}Al_{0.1}O_2$, and $LiNi_{0.8}Co_{0.1}Mn_{0.1}O_2$. When the positive electrode active material is the above-mentioned lithium salt-based positive electrode active material, the corresponding negative electrode active material can be one or more selected from graphite (such as artificial graphite, natural graphite), soft carbon, hard carbon, silicon carbon, lithium metal and lithium alloy.

In some embodiments, the positive electrode active material can also be one or more selected from $V_2O_5$, $MnO_2$, $TiS_2$, $FeS_2$, $SnS_2$ and $CuS_2$. When the positive electrode active material is the above-mentioned lithium salt-based positive electrode active material, the corresponding negative electrode active material should be a negative electrode active material capable of extracting the lithium ions, such as lithium metal or lithium alloy.

In the all-solid-state lithium secondary battery according to the second aspect of the present application, the positive electrode film can further comprise a conductive agent and a binder. The types of the conductive agent and the binder are not specifically limited, and can be selected based on actual needs.

In the all-solid-state lithium secondary battery according to the second aspect of the present application, the positive electrode film can further comprise the sulfide solid electrolyte according to the first aspect of the present application.

In some embodiments, preferably, the average particle size of the sulfide solid electrolyte in the positive electrode film is from 5 μm to 50 μm. The particle size of the sulfide solid electrolyte is within an appropriate range, which can make the positive electrode slurry have good dispersibility and reduce the agglomeration phenomenon among the particles, and can also make the positive electrode film have higher compaction density, so that the solid phase diffusion activation energy barrier of the lithium ions cancan be reduced, the diffusion coefficient of the lithium ions can be improved, and the battery can also have higher energy density.

More preferably, the average particle size of the sulfide solid electrolyte in the positive electrode membrane is from 10 μm to 20 μm.

In the all-solid-state lithium secondary battery according to the second aspect of the present application, the negative electrode film can further comprise a conductive agent and a binder. The types of the conductive agent and the binder are not specifically limited, and can be selected based on actual needs.

In the all-solid-state lithium secondary battery according to the second aspect of the present application, the negative electrode film can further comprise the sulfide solid electrolyte according to the first aspect of the present application.

In some embodiments, preferably, the average particle size of the sulfide solid electrolyte in the negative electrode film is from 5 μm to 50 μm. The particle size of the sulfide solid electrolyte is within an appropriate range, which can make the positive electrode slurry have good dispersibility and reduce the agglomeration phenomenon among the particles, and can also make the positive electrode film have higher compaction density, so that the solid phase diffusion activation energy barrier of the lithium ions can be reduced, the diffusion coefficient of the lithium ions can be improved, and the battery can also have higher energy density.

More preferably, the average particle size of the sulfide solid electrolyte in the negative electrode film is from 10 μm to 20 μm.

Figure 5:
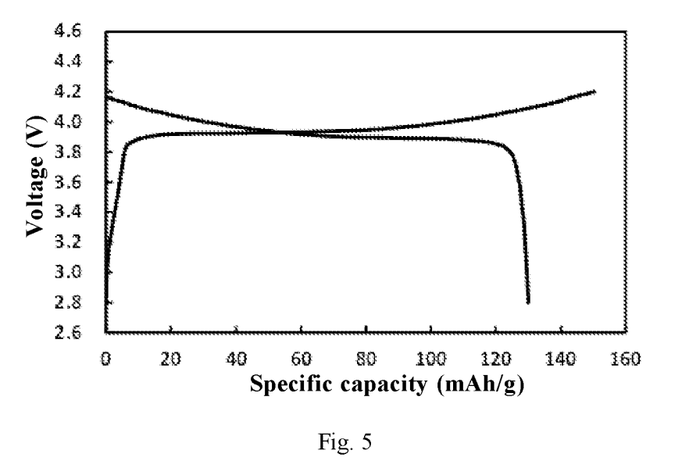
FIG. 5 is a first-cycle charging and discharging curve of an all-solid-state lithium secondary battery of Example 1.

The shape of the all-solid-state lithium secondary battery is not particularly limited in the present application, which can be cylindrical, square, or any other shape. FIG. 5 shows an all-solid-state lithium secondary battery 5 with a square structure as an example.

In some embodiments, the all-solid-state lithium secondary battery can comprise an outer package for packaging the positive electrode plate, the negative electrode plate and the solid electrolyte membrane.

In some embodiments, the outer package of the all-solid-state lithium secondary battery can be a soft package, such as a bag type soft package. The material of the soft package can be plastic, for example, it can comprise one or more of polypropylene PP, polybutylene terephthalate PBT, polybutylene succinate PBS, and the like. The outer package of the all-solid-state lithium secondary battery can also be a hard shell, such as a hard plastic shell, an aluminum shell, a steel shell, and the like.

Figure 6:
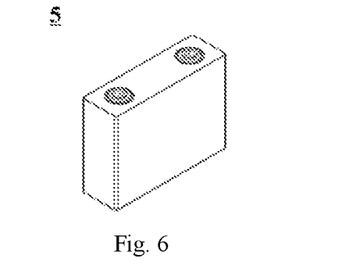
FIG. 6 is a schematic diagram of an embodiment of the all-solid-state lithium secondary battery.

In some embodiments, referring to FIG. 6, the outer package can include a shell 51 and a cover plate 53, wherein the shell 51 can include a bottom plate and a side plate connected to the bottom plate, and the bottom plate and the side plate are enclosed to form an accommodating cavity. The shell 51 has an opening connected with the accommodating cavity, and the cover plate 53 can cover the opening to close the accommodating cavity. The positive electrode plate, the negative electrode plate and the solid electrolyte membrane can be formed into an electrode component 52 through a lamination process or a winding process. The electrode component 52 is packaged in the accommodating cavity.

The number of the electrode components 52 contained in the all-solid-state lithium secondary battery 5 may be one or more, and may be adjusted based on needs.

In some embodiments, the all-solid-state lithium secondary batteries may be assembled into a battery module, the number of all-solid lithium secondary batteries contained in the battery module may be multiple, and the specific number may be adjusted according to the application and capacity of the battery module.

Figure 7:
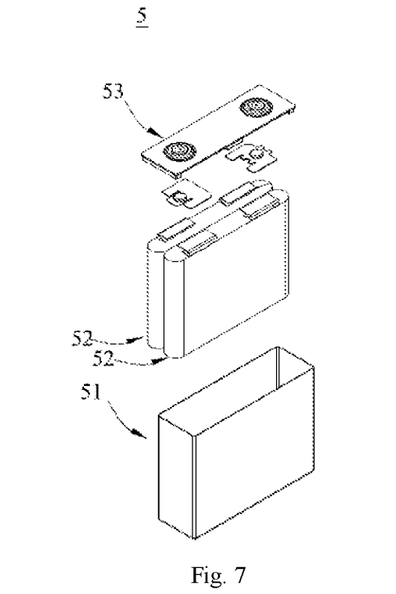
FIG. 7 is an exploded view of FIG. 6.

FIG. 7 shows a battery module 4 as an example. Referring to FIG. 7, in the battery module 4, a plurality of all-solid-state lithium secondary batteries 5 may be arranged in sequence along the length direction of the battery module 4. Of course, the all-solid-state lithium secondary batteries may also be arranged in any other manner. Furthermore, the plurality of all-solid-state lithium secondary batteries 5 may be fixed by fasteners.

Optionally, the battery module 4 may further include a housing having an accommodating space, and the plurality of all-solid-state lithium secondary batteries 5 are accommodated in the accommodating space.

In some embodiments, the above-mentioned battery modules may also be assembled into a battery pack, and the number of battery modules contained in the battery pack may be adjusted according to the application and capacity of the battery pack.

Figure 4:
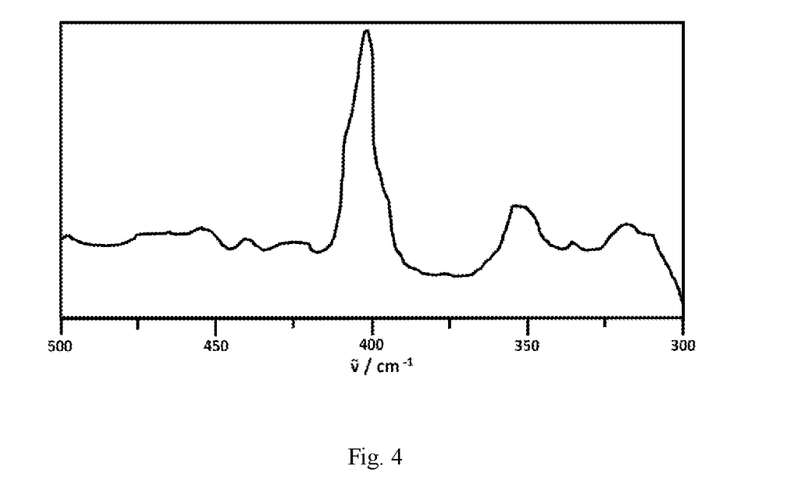
FIG. 4 is a Raman test curve of the sulfide solid electrolyte $70Li_2S-29P_2S_5-1Na_2S_2O_3$ of Example 1.
Figure 8:
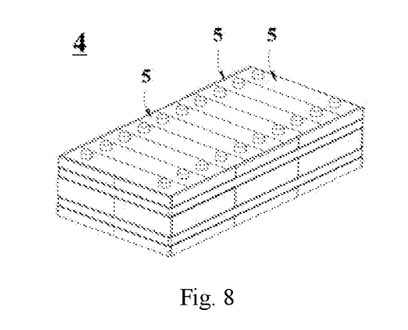
FIG. 8 is a schematic diagram of an embodiment of a battery module.
Figure 9:
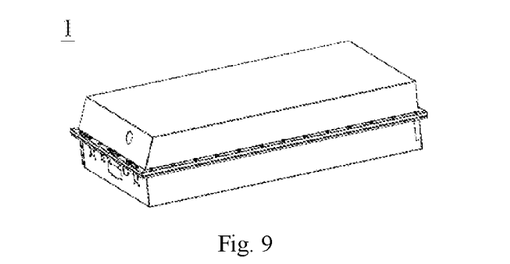
FIG. 9 is a schematic diagram of an embodiment of a battery pack.

FIG. 8 and FIG. 9 show a battery pack 1 as an example. Referring to FIG. 4 and FIG. 5, the battery pack 1 may include a battery box and a plurality of battery modules 4 disposed in the battery box. The battery box includes an upper box body 2 and a lower box body 3, and the upper box body 2 may be covered on the lower box body 3 and forms a closed space for accommodating the battery module 4. A plurality of battery modules 4 may be arranged in the battery box in any manner.

Apparatus

The present application further provides an apparatus, comprising the all-solid-state lithium secondary battery described in the present application. The all-solid-state lithium secondary battery may be used as a power supply of the apparatus, and may also be used as an energy storage unit of the apparatus. The apparatus may be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck, and the like), an electric train, a ship, a satellite, an energy storage system, etc.

The apparatus may select an all-solid-state lithium secondary battery, a battery module or a battery pack according to its use requirements.

Figure 10:
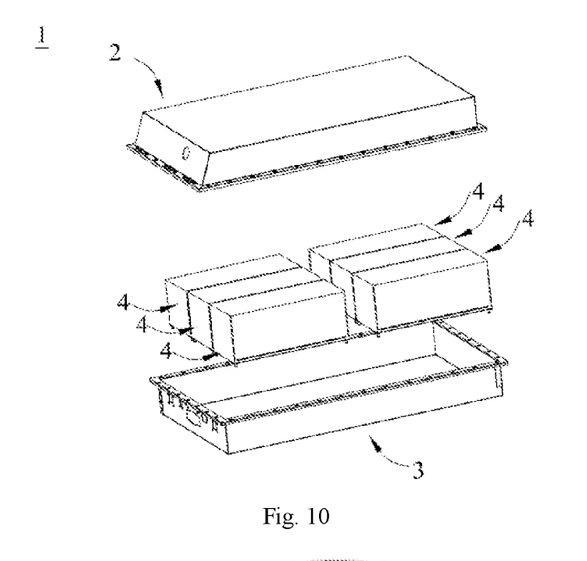
FIG. 10 is an exploded view of FIG. 9.
Figure 11:
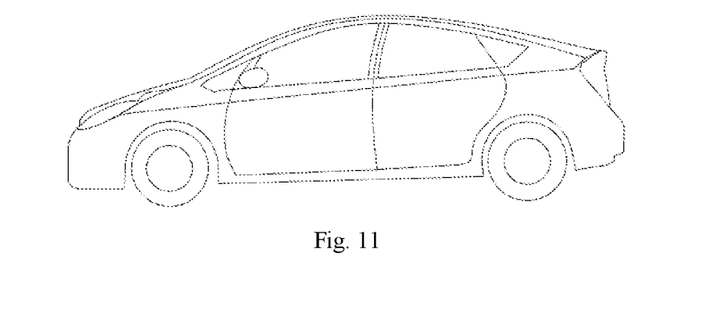
FIG. 11 is a schematic diagram of an embodiment of an apparatus utilizing the all-solid-state lithium secondary battery as a power supply.

FIG. 10 shows an apparatus as an example. The apparatus is a pure electric vehicle, a hybrid electric vehicle, or a plug-in hybrid electric vehicle, and so on. In order to meet the requirements of the apparatus for high power and high energy density of the battery, a battery pack or a battery module may be used.

As another example, the apparatus may be a mobile phone, a tablet computer, a notebook computer, and the like. The apparatus is generally required to be thin and light, and the all-solid-state lithium secondary battery may be used as the power supply.

EXEMPLARY EMBODIMENTS

Embodiment 1. A sulfide solid electrolyte obtained by compounding at least $Li_2S$, $P_2S_5$ and a dopant $M_xS_2O_3$, wherein M is one or more selected from Na, K, Ba and Ca, and $1 \leq x \leq 2$.

Embodiment 2. The sulfide solid electrolyte according to embodiment 1, wherein in the sulfide solid electrolyte,
a mole percentage of $Li_2S$ is greater than or equal to 60% and is less than or equal to 79%,
a mole percentage of $P_2S_5$ is greater than or equal to 16% and is less than or equal to 30%, and
a molar percentage of $M_xS_2O_3$ is greater than 0% and is less than or equal to 10%.

Embodiment 3. The sulfide solid electrolyte according to embodiment 1 or 2, wherein in the sulfide solid electrolyte,
the mole percentage of $Li_2S$ is greater than or equal to 70% and is less than or equal to 79%,
the mole percentage of $P_2S_5$ is greater than or equal to 20% and is less than or equal to 29%, and
the molar percentage of $M_xS_2O_3$ is less than or equal to 5%, and is preferably greater than or equal to 1% and less than or equal to 5%.

Embodiment 4. The sulfide solid electrolyte according to any one of embodiments 1 to 3, wherein the M comprises one or more of Na and K, and preferably M comprises Na.

Embodiment 5. The sulfide solid electrolyte according to any one of embodiments 1 to 4, wherein the sulfide solid electrolyte is a multiphase composite containing a glass phase and a crystal phase, comprising $PS_4^{3-}$, $P_2S_7^{4-}$ and $P_2S_6^{4-}$, and the ratio of Raman characteristic peak intensities of the $PS_4^{3-}$, $P_2S_7^{4-}$ and $P_2S_6^{4-}$ is 1-60: 1-60:0.01-1, and is preferably 20-40: 10-20:0.01-0.1.

Embodiment 6. The sulfide solid electrolyte according to any one of embodiments 1 to 5, wherein the sulfide solid electrolyte has an average particle size of 5 μm to 50 μm, and preferably 10 μm to 20 μm.

Embodiment 7. The sulfide solid electrolyte according to any one of embodiments 1 to 6, wherein the sulfide solid electrolyte has an ionic conductivity of 0.6 mS/cm to 2.5 mS/cm.

Embodiment 8. The sulfide solid electrolyte according to any one of embodiments 1 to 7, wherein in a cyclic voltammetry curve of the sulfide solid electrolyte, the peak current ratio of an anode peak to a cathode peak is from 0.55 to 0.85.

Embodiment 9. An all-solid-state lithium secondary battery, comprising a positive electrode plate, a negative electrode plate and a solid electrolyte membrane, wherein the solid electrolyte membrane comprises the sulfide solid electrolyte according to any one of embodiments 1 to 8.

Embodiment 10. The all-solid-state lithium secondary battery according to embodiment 9, wherein the sulfide solid electrolyte in the solid electrolyte membrane has an average particle size of 5 μm to 50 μm, and preferably 10 μm to 20 μm.

Embodiment 11. The all-solid-state lithium secondary battery according to embodiment 9 or 10, wherein the positive electrode plate and/or the negative electrode plate comprises the sulfide solid electrolyte according to any one of embodiments 1 to 8.

Embodiment 12. The all-solid-state lithium secondary battery according to embodiment 11, wherein the sulfide solid electrolyte in the positive electrode plate and/or the negative electrode plate has an average particle size of 5 μm to 50 μm, and preferably 10 μm to 20 μm.

Embodiment 13. An apparatus, comprising the all-solid-state lithium secondary battery according to any one of embodiments 9 to 12.

Embodiment 14. A method for the preparation of a sulfide solid electrolyte, comprising:
performing a ball milling treatment on $Li_2S$, $P_2S_5$ and the dopant $M_xS_2O_3$ in the presence of an organic solvent to obtain an incipient wet material;
removing the organic solvent from the incipient wet material to obtain a mixed material; and performing a heat treatment on the mixed material at a temperature of 150° C. to 450° C. for 0.5 h to 20 h to obtain the sulfide solid electrolyte.

Embodiment 15. The method according to embodiment 14, wherein the heat treatment temperature is from 200° C. to 400° C., and preferably from 230° C. to 300° C.; and/or, the heat treatment time is from 1 h to 10 h, and preferably from 2 h to 5 h.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

(1) Preparation of a Sulfide Solid Electrolyte

In a dry argon atmosphere (the moisture content was less than 1 ppm, and the oxygen content was less than 1 ppm), $Li_2S$, $P_2S_5$ and $Na_2S_2O_3$ with purity of more than 99% were respectively weighed according to a molar ratio of 70:29:1, and then were placed in a mortar to be manually pre-mixed to obtain an incipient premix. Then 3 mL incipient premix was taken and placed in a 45 mL $ZrO_2$ ball milling tank (the ball-to-material ratio was 45:1), the ball milling tank was sealed after 10 mL cyclohexane organic solvent was added, and high-energy ball milling was performed for 20 h at a rotating speed of 500 rpm to obtain an incipient wet material. In the argon dry atmosphere (the moisture content was less than 1 ppm, and the oxygen content was less than 1 ppm), the incipient wet material was subjected to vacuum pumping to remove the organic solvent to obtain incipient dry powder, and then the incipient dry powder was tableted at a pressure of 20 MPa to form a flake material. The flake material was placed in the argon dry atmosphere (the moisture content was less than 1 ppm, and the oxygen content was less than 1 ppm), heated to 250° C. at a heating rate of 2° C./min, kept for 2 h, and discharged after being cooled to room temperature with the furnace, and then the flake material was ground and pulverized to an average particle size of 20 μm to obtain a sulfide solid electrolyte $70Li_2S$-$29P_2S_5$-$1Na_2S_2O_3$.

(2) Preparation of an all-Solid-State Lithium Secondary Battery

A positive electrode film was obtained by uniformly mixing a positive electrode active material with the sulfide solid electrolyte prepared in step (1) at a mass ratio of 70:30 and then pressing into a layered shape, wherein the positive electrode active material was $LiCoO_2$, and a positive electrode current collector was an aluminum foil.

A lithium metal sheet was used as a negative electrode plate.

The positive electrode current collector, the positive electrode film, the sulfide solid electrolyte prepared in step (1) and the negative electrode plate were assembled into the all-solid-state lithium secondary battery by pressure molding.

The working voltage range of the above-mentioned all-solid-state lithium secondary battery was set to 2.8 V to 4.2 V, a cycle test was carried out in a constant current charging and discharging manner, and the first-cycle specific discharge capacity, the first-cycle coulombic efficiency and the capacity retention rate after 100 weeks of circulation of the all-solid-state lithium secondary battery were obtained. Among them, the test current was 0.1 C (the current density was 0.13 mA/cm$^2$), and the test temperature was 25° C.

100 mg of the sulfide solid electrolyte prepared in step (1) was pressed into a solid electrolyte membrane with a diameter of 10 mm at a pressure of 20 MPa. A symmetric battery was constructed by using stainless steel as a blocking electrode, and the impedance of the sulfide solid electrolyte at 25° C. was tested. The ionic conductivity of the sulfide solid electrolyte was calculated by the formula σ=l/(R·S), wherein 6 represented the ionic conductivity, l represented the thickness of the solid electrolyte membrane, R represented the impedance value of the sulfide solid electrolyte, and S represented the area of the front face of the solid electrolyte membrane.

100 mg of the sulfide solid electrolyte prepared in step (1) was pressed into a solid electrolyte membrane with a diameter of 10 mm at a pressure of 20 MPa, and then the electrochemical stability of the sulfide solid electrolyte was tested by using lithium metal as a working electrode and stainless steel as a counter electrode. The scanning potential interval was from −0.5 V to 6 V, and the process was set to scan negatively from the open circuit potential to −0.5 V at a scanning speed of 1 mV/s, then the potential was reversed and was scanned to 6 V, and finally was scanned back to the open circuit potential. The test conditions were normal temperature 25° C. and normal pressure 0.1 MPa.

XRD test of the sulfide solid electrolyte: an X-ray diffractometer (such as Bruker D8 Discover) was employed for the test. The test can refer to JIS K 0131-1996. In the X-ray diffraction analysis test, CuKα rays were used as a radiation source, the ray wavelength was λ=1.5418 Å, the scanning 2θ angle range was from 5° to 80°, and the scanning rate was 4°/min.

The $PS_4^{3-}$, $P_2S_7^{4-}$ and $P_2S_6^{4-}$ in the sulfide solid electrolyte can be measured by the Raman spectrum, such as the Senterra Raman tester. The test conditions may be: the excitation light wavelength was 532 nm, and the power was 2 mW. The sample may be crushed, soaked in silicone oil and placed between glass plates for testing. The Raman characteristic peak intensities of $PS_4^{3-}$, $P_2S_7^{4-}$ and $P_2S_6^{4-}$ were expressed by the integrated areas of the corresponding characteristic peaks. In the Raman spectrum, the position of $PS_4^{3-}$ was near 418 cm$^{-1}$; the position of $P_2S_7^{4-}$ was near 406 cm$^{-1}$; and the position of $P_2S_6^{4-}$ was near 387 cm$^{-1}$.

The test of the average particle size of the sulfide solid electrolyte: the average particle size may be measured by using a laser particle size analyzer (such as Malvern Master Size 3000) with reference to the standard GB/T 19077.1-2016, wherein the average particle size (i.e., $D_v50$) was the particle size corresponding to when the cumulative volume distribution percentage of the material reached 50%.

Example 2

The preparation of the sulfide solid electrolyte and the all-solid-state lithium secondary battery was the same as that in Example 1, except that the positive electrode active material of the all-solid-state lithium secondary battery adopted $LiNi_{0.8}Co_{0.1}Al_{0.1}O_2$.

The test of the sulfide solid electrolyte and the all-solid-state lithium secondary battery was the same as that in Example 1. The difference lay in that the working voltage range of the above-mentioned all-solid-state lithium secondary battery was set to 2.8 V to 4.2 V, the cycle test was performed in a constant current charging and discharging manner, the test current was 0.1 C (the current density is 0.15 mA/cm$^2$), and the test temperature was 25° C.

Example 3

The preparation of the sulfide solid electrolyte and the all-solid-state lithium secondary battery was the same as that in Example 1, except that the positive electrode active material of the all-solid-state lithium secondary battery adopted $LiNi_{0.8}Co_{0.1}Mn_{0.1}O_2$.

The test of the sulfide solid electrolyte and the all-solid-state lithium secondary battery was the same as that in Example 1. The difference lay in that the working voltage range of the above-mentioned all-solid-state lithium secondary battery was set to 2.8 V to 4.2 V, the cycle test was performed in a constant current charging and discharging manner, the test current was 0.1 C (the current density is 0.17 mA/cm$^2$), and the test temperature was 25° C.

Example 4

The preparation of the sulfide solid electrolyte and the all-solid-state lithium secondary battery was the same as that in Example 1. The difference lay in that the molar ratio of $Li_2S$, $P_2S_5$ and $Na_2S_2O_3$ was 70:28:2, the obtained sulfide solid electrolyte was $70Li_2S-28P_2S_5-2Na_2S_2O_3$, and the average particle size was 20 μm.

Example 5

The preparation of the sulfide solid electrolyte and the all-solid-state lithium secondary battery was the same as that in Example 1. The difference lay in that the molar ratio of $Li_2S$, $P_2S_5$ and $Na_2S_2O_3$ was 70:25:5, the obtained sulfide solid electrolyte was $70Li_2S-25P_2S_5-5Na_2S_2O_3$, and the average particle size was 20 μm.

Example 6

The preparation of the sulfide solid electrolyte and the all-solid-state lithium secondary battery was the same as that in Example 1. The difference lay in that the molar ratio of $Li_2S$, $P_2S_5$ and $Na_2S_2O_3$ was 70:20:10, the obtained sulfide solid electrolyte was $70Li_2S-20P_2S_5-10Na_2S_2O_3$, and the average particle size was 20 μm.

Example 7

The preparation of the sulfide solid electrolyte and the all-solid-state lithium secondary battery was the same as that in Example 1. The difference lay in that the heat treatment conditions were heating to 200° C. at a heating rate of 2° C./min and holding for 2 h, the obtained sulfide solid electrolyte was $70Li_2S-29P_2S_5-1Na_2S_2O_3$, and the average particle size was 20 μm.

Example 8

The preparation of the sulfide solid electrolyte and the all-solid-state lithium secondary battery was the same as that in Example 1. The difference lay in that the heat treatment conditions were heating to 400° C. at a heating rate of 2° C./min and holding for 2 h, the obtained sulfide solid electrolyte was $70Li_2S-29P_2S_5-1Na_2S_2O_3$, and the average particle size was 20 μm.

Example 9

The preparation of the sulfide solid electrolyte and the all-solid-state lithium secondary battery was the same as that in Example 1. The difference lay in that the heat treatment conditions were heating to 250° C. at a heating rate of 2° C./min and holding for 0.5 h, the obtained sulfide solid electrolyte was $70Li_2S-29P_2S_5-1Na_2S_2O_3$, and the average particle size was 20 μm.

Example 10

The preparation of the sulfide solid electrolyte and the all-solid-state lithium secondary battery was the same as that in Example 1. The difference lay in that the heat treatment conditions were heating to 250° C. at a heating rate of 2° C./min and holding for 20 h, the obtained sulfide solid electrolyte was $70Li_2S-29P_2S_5-1Na_2S_2O_3$, and the average particle size was 20 μm.

Example 11

The preparation of the sulfide solid electrolyte and the all-solid-state lithium secondary battery was the same as that in Example 1. The difference lay in that the molar ratio of $Li_2S$, $P_2S_5$ and $Na_2S_2O_3$ is 65:34:1, the obtained sulfide solid electrolyte was $65Li_2S-34P_2S_5-1Na_2S_2O_3$, and the average particle size was 20 μm.

Example 12

The preparation of the sulfide solid electrolyte and the all-solid-state lithium secondary battery was the same as that in Example 1. The difference lay in that the molar ratio of $Li_2S$, $P_2S_5$ and $Na_2S_2O_3$ was 75:24:1, the obtained sulfide solid electrolyte was $75Li_2S-24P_2S_5-1Na_2S_2O_3$, and the average particle size was 20 μm.

Example 13

The preparation of the sulfide solid electrolyte and the all-solid-state lithium secondary battery was the same as that in Example 1. The difference lay in that the molar ratio of $Li_2S$, $P_2S_5$ and $Na_2S_2O_3$ was 80:19:1, the obtained sulfide solid electrolyte was $80Li_2S-19P_2S_5-1Na_2S_2O_3$, and the average particle size was 20 μm.

Example 14

The preparation of the sulfide solid electrolyte and the all-solid-state lithium secondary battery was the same as that in Example 1. The difference lay in that the incipient premix was prepared from $Li_2S$, $P_2S_5$ and $K_2S_2O_3$ according to a molar ratio of 70:29:1, the obtained sulfide solid electrolyte was $70Li_2S-29P_2S_5-1K_2S_2O_3$, and the average particle size was 20 μm.

Example 15

The preparation of the sulfide solid electrolyte and the all-solid-state lithium secondary battery was the same as that in Example 1, except that the average particle size of the sulfide solid electrolyte $70Li_2S\text{-}29P_2S_5\text{-}1Na_2S_2O_3$ was 35 μm.

Example 16

The preparation of the sulfide solid electrolyte and the all-solid-state lithium secondary battery was the same as that in Example 1, except that the average particle size of the sulfide solid electrolyte $70Li_2S\text{-}29P_2S_5\text{-}1Na_2S_2O_3$ was 45 μm.

Comparative Example 1

The preparation of the sulfide solid electrolyte and the all-solid-state lithium secondary battery was the same as that in Example 1. The difference lay in that the sulfide solid electrolyte only contained $Li_2S$ and $P_2S_5$, which were manually pre-mixed in a mortar at a molar ratio of 70:30, the obtained sulfide solid electrolyte was $70Li_2S\text{-}30P_2S_5$, and the average particle size was 20 μm.

Comparative Example 2

The preparation of the sulfide solid electrolyte and the all-solid-state lithium secondary battery was the same as that in Example 1. The difference lay in that the heat treatment temperature was 100° C., the obtained sulfide solid electrolyte was $70Li_2S\text{-}29P_2S_5\text{-}1Na_2S_2O_3$, and the average particle size was 20 μm.

Comparative Example 3

The preparation of the sulfide solid electrolyte and the all-solid-state lithium secondary battery was the same as that in Example 1. The difference lay in that the heat treatment temperature was 500° C., the obtained sulfide solid electrolyte was $70Li_2S\text{-}29P_2S_5\text{-}1Na_2S_2O_3$, and the average particle size was 20 μm.

Comparative Example 4

The preparation of the sulfide solid electrolyte and the all-solid-state lithium secondary battery was the same as that in Example 1. The difference lay in that the heat treatment time was 0.1 h, the obtained sulfide solid electrolyte was $70Li_2S\text{-}29P_2S_5\text{-}1Na_2S_2O_3$, and the average particle size was 20 μm.

Comparative Example 5

The preparation of the sulfide solid electrolyte and the all-solid-state lithium secondary battery was the same as that in Example 1. The difference lay in that the heat treatment time was 25 h, the obtained sulfide solid electrolyte was $70Li_2S\text{-}29P_2S_5\text{-}1Na_2S_2O_3$, and the average particle size was 20 μm.

Comparative Example 6

The preparation of the sulfide solid electrolyte and the all-solid-state lithium secondary battery was the same as that in Example 1, except that the average particle size of the sulfide solid electrolyte $70Li_2S\text{-}29P_2S_5\text{-}1Na_2S_2O_3$ was 70 μm.

Comparative Example 7

The preparation of the sulfide solid electrolyte and the all-solid-state lithium secondary battery was the same as that in Example 1, except that the average particle size of the sulfide solid electrolyte $70Li_2S\text{-}29P_2S_5\text{-}1Na_2S_2O_3$ was 3 μm.

In Examples 4-16 and Comparative Examples 1-7, the test of the sulfide solid electrolyte and the all-solid-state lithium secondary battery was the same as that in Example 1.

TABLE 1

Performance test results of Examples 1-16 and Comparative Examples 1-7

| | Sulfide solid electrolyte | | All-solid-state lithium secondary battery | | |
|---|---|---|---|---|---|
| | Peak current ratio of anode peak to cathode peak | Ionic conductivity mS/cm | First-cycle specific capacity mAh/g | First-cycle coulombic efficiency | Capacity retention rate after 100 weeks of cycles |
| Example 1 | 0.83 | 1.77 | 130 | 87% | 94% |
| Example 2 | 0.83 | 1.77 | 141 | 81% | 83% |
| Example 3 | 0.83 | 1.77 | 153 | 80% | 81% |
| Example 4 | 0.81 | 1.68 | 124 | 85% | 90% |
| Example 5 | 0.78 | 1.42 | 117 | 83% | 89% |
| Example 6 | 0.76 | 1.27 | 109 | 80% | 83% |
| Example 7 | 0.79 | 1.21 | 111 | 81% | 85% |
| Example 8 | 0.81 | 1.05 | 93 | 74% | 68% |
| Example 9 | 0.78 | 1.08 | 97 | 78% | 86% |
| Example 10 | 0.77 | 0.73 | 79 | 71% | 73% |
| Example 11 | 0.77 | 0.62 | 77 | 69% | 80% |
| Example 12 | 0.81 | 0.87 | 91 | 85% | 89% |
| Example 13 | 0.78 | 0.76 | 82 | 82% | 88% |
| Example 14 | 0.77 | 1.42 | 118 | 85% | 91% |
| Example 15 | 0.75 | 1.72 | 115 | 83% | 87% |
| Example 16 | 0.75 | 1.67 | 112 | 82% | 82% |
| Comparative Example 1 | 0.51 | 1.24 | 102 | 82% | 86% |
| Comparative Example 2 | 0.55 | 0.64 | 52 | 47% | 54% |
| Comparative Example 3 | 0.72 | 0.76 | 77 | 68% | 64% |

TABLE 1-continued

Performance test results of Examples 1-16 and Comparative Examples 1-7

| | Sulfide solid electrolyte | | All-solid-state lithium secondary battery | | |
| --- | --- | --- | --- | --- | --- |
| | Peak current ratio of anode peak to cathode peak | Ionic conductivity mS/cm | First-cycle specific capacity mAh/g | First-cycle coulombic efficiency | Capacity retention rate after 100 weeks of cycles |
| Comparative Example 4 | 0.63 | 0.78 | 64 | 65% | 42% |
| Comparative Example 5 | 0.67 | 0.68 | 73 | 69% | 72% |
| Comparative Example 6 | 0.70 | 0.97 | 108 | 79% | 67% |
| Comparative Example 7 | 0.83 | 1.77 | 130 | 87% | 94% |

Figure 1:
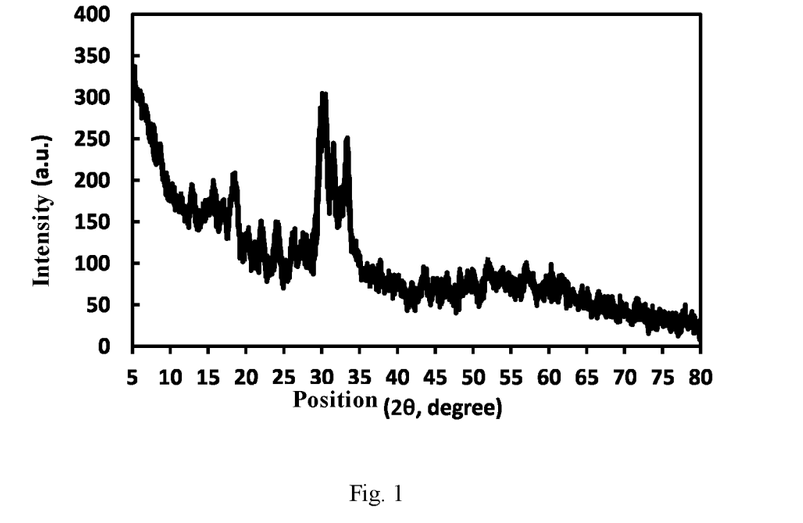
FIG. 1 is an XRD spectrum of a sulfide solid electrolyte $70Li_2S-29P_2S_5-1Na_2S_2O_3$ of Example 1.

FIG. 1 was an XRD spectrum of the sulfide solid electrolyte $70Li_2S-29P_2S_5-1Na_2S_2O_3$ of Example 1. It can be seen from FIG. 1 that the sulfide solid electrolyte $70Li_2S-29P_2S_5-1Na_2S_2O_3$ was a glass ceramic solid electrolyte, which provided a good channel for the transmission of lithium ions therein, and had good ionic conductivity.

Figure 2:
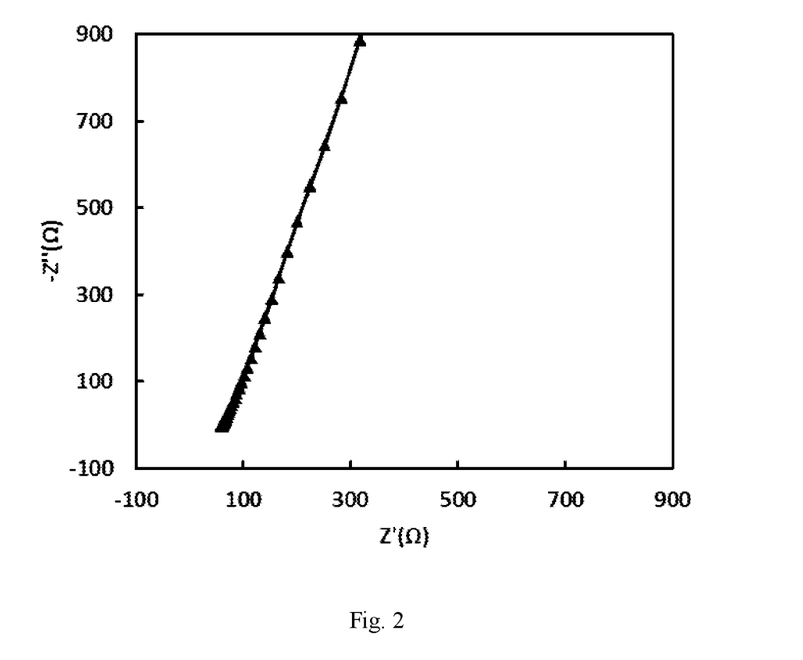
FIG. 2 is an impedance spectrum of the sulfide solid electrolyte $70Li_2S-29P_2S_5-1Na_2S_2O_3$ of Example 1 at 25° C.

FIG. 2 was an impedance spectrum of the sulfide solid electrolyte $70Li_2S-29P_2S_5-1Na_2S_2O_3$ of Example 1 at 25° C. It can be seen from FIG. 2 that the ionic conductivity of the sulfide solid electrolyte $70Li_2S-29P_2S_5-1Na_2S_2O_3$ was 1.77 mS/cm, which indicated that the sulfide solid electrolyte $70Li_2S-29P_2S_5-1Na_2S_2O_3$ had good ionic conductivity.

Figure 3:
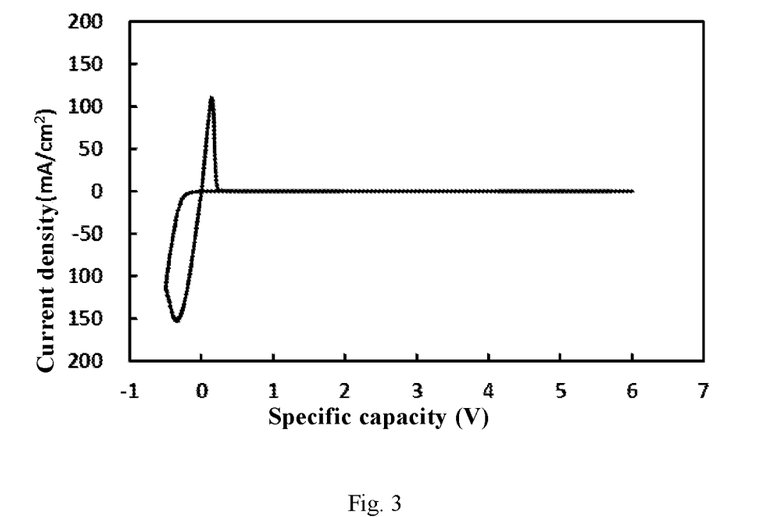
FIG. 3 is a cyclic voltammetry curve of the sulfide solid electrolyte $70Li_2S-29P_2S_5-1Na_2S_2O_3$ of Example 1 with metallic lithium as a working electrode and stainless steel as a counter electrode.

FIG. 3 was a cyclic voltammetry curve of the sulfide solid electrolyte $70Li_2S-29P_2S_5-1Na_2S_2O_3$ of Example 1 with metallic lithium as a working electrode and stainless steel as a counter electrode. It can be seen from FIG. 3 that at about 0V, the curve was basically symmetrical up and down, so it may be judged that a large degree of reversible lithium deposition and dissolution have occurred on the positive and negative electrodes. At the same time, no obvious oxidation current peak or reduction current peak was observed subsequently, which meant that no electrochemical oxidation or reduction reaction occurred at the subsequent potential, so it can indicate that the sulfide solid electrolyte $70Li_2S-29P_2S_5-1Na_2S_2O_3$ had good electrochemical stability.

FIG. 5 was a first-cycle charging and discharging curve of the all-solid-state lithium secondary battery of Example 1. It can be seen from FIG. 5 that by using $70Li_2S-29P_2S_5-1Na_2S_2O_3$ as the sulfide solid electrolyte, the $Li_2CO_2$ charging and discharging voltage platform can be improved, and therefore may make the all-solid-state lithium secondary battery have higher first week specific capacity.

From the analysis of the test results of Examples 1-3 and Comparative Example 1, it can be seen that under the same conditions, after the dopant $Na_2S_2O_3$ was introduced, the peak current ratio of the anode peak to the cathode peak of the sulfide solid electrolyte and the ionic conductivity were improved significantly. At the same time, the all-solid-state lithium secondary battery using the sulfide solid electrolyte also had higher first-cycle specific capacity, first-cycle coulombic efficiency and capacity retention rate.

From the analysis of the test results of Examples 1 and 4-6, it can be seen that the addition amount of the dopant $Na_2S_2O_3$ had an effect on the ionic conductivity of the sulfide solid electrolyte, as well as the first-cycle specific capacity, the first-cycle coulombic efficiency and the capacity retention rate of the all-solid-state lithium secondary battery. As the molar content of $Na_2S_2O_3$ increased, the ionic conductivity of the sulfide solid electrolyte shown a decreasing trend, the reason may be that the presence of $Na_2S_2O_3$ had a greater impact on the lattice structure of the crystal phase in the sulfide solid electrolyte, the greater the content of $Na_2S_2O_3$ was, the more unstable the lattice structure was, and when the instability of the lattice structure was too large, it affected the migration of the lithium ions, which in turn affected the ionic conductivity of the sulfide solid electrolyte, as well as the first-cycle specific capacity, the first-cycle coulombic efficiency and the capacity retention rate of the all-solid-state lithium secondary battery.

From the analysis of the test results of Example 1, Example 7-8 and Comparative Example 2-3, it can be seen that the heat treatment temperature had a relatively obvious effect on the performance of the sulfide solid electrolyte. Under the same heat treatment time, the heat treatment temperature of Comparative Example 2 was too low, the sulfide solid electrolyte basically did not contain the $PS_4^{3-}$ phase and $P_2S_7^{4-}$ phase with high ionic conductivity, so the ionic conductivity of the sulfide solid electrolyte was relatively low. While the heat treatment temperature of Comparative Example 3 was too high, most of the $P_2S_7^{4-}$ phase with high ionic conductivity was decomposed to form the $P_2S_6^{4-}$ phase with low ionic conductivity, so the ionic conductivity of the sulfide solid electrolyte was also relatively low.

From the analysis of the test results of Example 1, Example 9-10 and Comparative Example 4-5, it can be seen that the heat treatment time also affected the performance of the sulfide solid electrolyte. Under the same heat treatment temperature, the heat treatment time of Comparative Example 4 was too short, it was insufficient to form more $PS_4^{3-}$ phase and $P_2S_7^{4-}$ phase with high ionic conductivity, so the ionic conductivity of the sulfide solid electrolyte was relatively low; and the heat treatment time of Comparative Example 5 was too long, it was easy to cause most of the $P_2S_7^{4-}$ phase with high ionic conductivity to decompose to form the $P_2S_6^{4-}$ phase with low ionic conductivity, so the ionic conductivity of the sulfide solid electrolyte was also relatively low.

From the analysis of the test results of Examples 1 and 11-13, it can be seen that the change in the content of $Li_2S$ serving as the glass phase network modified sulfide in the sulfide solid electrolyte also affected the ionic conductivity of the sulfide solid electrolyte, as well as the first-cycle specific capacity, the first-cycle coulombic efficiency and the capacity retention rate of the all-solid-state lithium secondary battery. If the molar content of $Li_2S$ was relatively small, on one hand, it reduced the source of the lithium ions in the sulfide solid electrolyte, and on the other hand, the obtained sulfide solid electrolyte contained more bridging sulfur, which was not conducive to the rapid transmission of the lithium ions; and if the molar content of Li$_2$S was relatively large, the content of the bridging sulfur in the sulfide solid electrolyte will decrease, the content of the non-bridging sulfur will increase, the non-bridging sulfur tended to trap the lithium ions, making them difficult to move, which was also not conducive to reaching the optimal ionic conductivity of the sulfide solid electrolyte.

From the test results of Example 1 and Example 14, it can be seen that as the dopant M$_2$S$_2$O$_3$ increased with the size of the introduced alkali metal atom M, the degree of lattice distortion of the system increased, which will lead to a slight decrease in the ionic conductivity of the sulfide solid electrolyte, but the sulfide solid electrolyte may still maintain higher ionic conductivity as a whole, so that the all-solid-state lithium secondary battery had good first-cycle specific capacity, first-cycle coulombic efficiency and cycle capacity retention rate.

From the analysis of the test results of Example 1, Examples 15-16 and Comparative Examples 6-7, it can be seen that the average particle size of the sulfide solid electrolyte had an influence on the performance of the all-solid-state lithium secondary battery. In Example 1 and Examples 15-16, the average particle size of the sulfide solid electrolyte was relatively moderate, and the all-solid-state battery also exhibited higher first-cycle specific capacity, higher first-cycle coulombic efficiency and higher cycle capacity retention rate. The average particle size of the sulfide solid electrolyte in Comparative Example 6 was too large, such that after the internal volume of the all-solid-state lithium secondary battery changed during the charging and discharging process, the interface contact among the solid electrolyte membrane, the positive electrode plate and the negative electrode plate was deteriorated, the interface resistance increased, and in turn caused deterioration in the cycle performance of the all-solid-state lithium secondary battery, which was manifested as a decrease in the cycle capacity retention rate of the all-solid-state lithium secondary battery. The average particle size of the sulfide solid state in Comparative Example 7 was too small, and the first-cycle specific capacity, the first-cycle coulombic efficiency and the cycle capacity retention rate of the all-solid-state lithium secondary battery did not show a significant improvement compared to Example 1, but the required preparation conditions and process difficulty were significantly increased, therefore it was not suitable for the manufacture of the sulfide all-solid-state battery.

TABLE 2

Raman spectrum test of the sulfide solid electrolyte

| | Ratio of Raman characteristic peak intensities of PS$_4^{3-}$, P$_2$S$_7^{4-}$ and P$_2$S$_6^{4-}$ |
|---|---|
| Example 1 | 24:17:0.05 |
| Example 4 | 28:14:0.05 |
| Example 5 | 40:5:0.07 |
| Example 6 | 60:3:0.1 |
| Example 7 | 24:17:0.05 |
| Example 8 | 22:17:1 |
| Example 9 | 12:8:0.01 |
| Example 10 | 22:17:1 |
| Example 11 | 6:37:0.05 |
| Example 12 | Trace P$_2$S$_7^{4-}$ |
| Example 13 | Trace P$_2$S$_7^{4-}$ |
| Example 14 | 24:17:0.05 |
| Example 15 | 24:17:0.05 |
| Example 16 | 24:17:0.05 |
| Comparative Example 1 | 20:17:2 |
| Comparative Example 2 | 1:1:0.01 |
| Comparative Example 3 | 5:6:9 |
| Comparative Example 4 | 1:1:0.01 |
| Comparative Example 5 | 4:7:9 |
| Comparative Example 6 | 24:17:0.05 |
| Comparative Example 7 | 24:17:0.05 |

It can be seen from Table 2 that the sulfide solid electrolyte of the examples of the present application contained more PS$_4^{3-}$ phase and P$_2$S$_7^{4-}$ phase with high ionic conductivity, and less P$_2$S$_6^{4-}$ phase with low ionic conductivity.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A sulfide solid electrolyte comprising at least Li$_2$S, P$_2$S$_5$ and a dopant M$_x$S$_2$O$_3$, characterized in that, M is one or more selected from Na and K, and $1 \leq x \leq 2$;
    in the sulfide solid electrolyte,
    a mole percentage of Li$_2$S is greater than or equal to 60% and is less than or equal to 79%,
    a mole percentage of P$_2$S$_5$ is greater than or equal to 16% and is less than or equal to 30%, and
    a molar percentage of M$_x$S$_2$O$_3$ is greater than 0% and is less than or equal to 10%.

2. The sulfide solid electrolyte according to claim 1, wherein in the sulfide solid electrolyte,
    the mole percentage of Li$_2$S is greater than or equal to 70% and is less than or equal to 79%,
    the mole percentage of P$_2$S$_5$ is greater than or equal to 20% and is less than or equal to 29%, and
    the molar percentage of M$_x$S$_2$O$_3$ is less than or equal to 5%.

3. The sulfide solid electrolyte according to claim 1, wherein the M comprises one or more of Na and K.

4. The sulfide solid electrolyte according to claim 1, wherein the sulfide solid electrolyte is a multiphase composite containing a glass phase and a crystal phase, comprising PS$_4^{3-}$, P$_2$S$_7^{4-}$ and P$_2$S$_6^{4-}$, and the ratio of Raman characteristic peak intensities of the PS$_4^{3-}$, P$_2$S$_7^{4-}$ and P$_2$S$_6^{4-}$ is 1-60: 1-60:0.01-1.

5. The sulfide solid electrolyte according to claim 1, wherein the sulfide solid electrolyte has an average particle size of 5 μm to 50 μm.

6. The sulfide solid electrolyte according to claim 1, wherein the sulfide solid electrolyte has an ionic conductivity of 0.6 mS/cm to 2.5 mS/cm.

7. The sulfide solid electrolyte according to claim 1, wherein in a cyclic voltammetry curve of the sulfide solid electrolyte, the peak current ratio of an anode peak to a cathode peak is from 0.55 to 0.85.

8. An all-solid-state lithium secondary battery (5), characterized in that, the all-solid-state lithium secondary battery (5) comprises a positive electrode plate, a negative electrode plate and a solid electrolyte membrane, wherein the solid electrolyte membrane comprises the sulfide solid electrolyte according to claim 1.

9. The all-solid-state lithium secondary battery (5) according to claim 8, wherein the sulfide solid electrolyte in the solid electrolyte membrane has an average particle size of 5 μm to 50 μm.

10. The all-solid-state lithium secondary battery (5) according to claim 8, wherein the positive electrode plate and/or the negative electrode plate comprises a sulfide solid electrolyte comprising at least $Li_2S$, $P_2S_5$ and a dopant $M_xS_2O_3$, M is one or more selected from Na and K, Ba and Ca, and $1 \leq x \leq 2$;

in the sulfide solid electrolyte,
a mole percentage of $Li_2S$ is greater than or equal to 60% and is less than or equal to 79%,
a mole percentage of $P_2S_5$ is greater than or equal to 16% and is less than or equal to 30%, and
a molar percentage of $M_xS_2O_3$ is greater than 0% and is less than or equal to 10%.

11. The all-solid-state lithium secondary battery (5) according to claim 10, wherein the sulfide solid electrolyte in the positive electrode plate and/or the negative electrode plate has an average particle size of 5 μm to 50 μm.

12. An apparatus, characterized in that, the apparatus comprises the all-solid-state lithium secondary battery (5) according to claim 8.

13. A method for the preparation of the sulfide solid electrolyte according to claim 1, characterized in that, the method comprises:
performing a ball milling treatment on $Li_2S$, $P_2S_5$ and the dopant $M_xS_2O_3$, characterized in that, M is one or more selected from Na and K, and $1 \leq x \leq 2$, in the presence of an organic solvent to obtain an incipient wet material;
removing the organic solvent from the incipient wet material to obtain a mixed material; and
performing a heat treatment on the mixed material at a temperature of 150° C. to 450° C. for 0.5 h to 20 h to obtain the sulfide solid electrolyte,
wherein in the sulfide solid electrolyte,
a mole percentage of $Li_2S$ is greater than or equal to 60% and is less than or equal to 79%,
a mole percentage of $P_2S_5$ is greater than or equal to 16% and is less than or equal to 30%, and
a molar percentage of $M_xS_2O_3$ is greater than 0% and is less than or equal to 10%.

14. The method according to claim 13, wherein the heat treatment temperature is from 200° C. to 400° C.; and/or, the heat treatment time is from 1 h to 10 h.

15. The sulfide solid electrolyte according to claim 1, wherein in the sulfide solid electrolyte, the molar percentage of $M_xS_2O_3$ is greater than or equal to 1% and less than or equal to 5%.

16. The sulfide solid electrolyte according to claim 1, wherein the M comprises Na.

17. The sulfide solid electrolyte according to claim 1, wherein the sulfide solid electrolyte is a multiphase composite containing a glass phase and a crystal phase, comprising $PS_4^{3-}$, $P_2S_7^{4-}$ and $P_2S_6^{4-}$, and the ratio of Raman characteristic peak intensities of the $PS_4^{3-}$, $P_2S_7^{4-}$ and $P_2S_6^{4-}$ is 20-40: 10-20:0.01-0.1.

18. The sulfide solid electrolyte according to claim 1, wherein the sulfide solid electrolyte has an average particle size of 10 μm to 20 μm.

19. The all-solid-state lithium secondary battery (5) according to claim 8, wherein the sulfide solid electrolyte in the solid electrolyte membrane has an average particle size of 10 μm to 20 μm.

20. The method according to claim 13, wherein the heat treatment temperature is from 2 230° C. to 300° C., and/or, wherein the heat treatment time is from 2 h to 5 h.

\* \* \* \* \*